United States Patent
Schmid et al.

(10) Patent No.: US 7,106,251 B2
(45) Date of Patent: Sep. 12, 2006

(54) RECEIVER IN A POSITION-FINDING SYSTEM AND METHOD FOR POSITION-FINDING WITH INCREASED SENSITIVITY

(75) Inventors: Andreas Schmid, Duisburg (DE); André Neubauer, Krefeld (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 11/186,316

(22) Filed: Jul. 21, 2005

(65) Prior Publication Data
US 2006/0017615 A1 Jan. 26, 2006

(30) Foreign Application Priority Data
Jul. 22, 2004 (DE) .................. 10 2004 035 608

(51) Int. Cl.
*G01S 3/02* (2006.01)
(52) U.S. Cl. ...................... 342/464; 342/443
(58) Field of Classification Search ............ 342/386, 342/443, 457, 463, 464; 455/24, 63.1
See application file for complete search history.

(56) References Cited

U.S. PATENT DOCUMENTS

| 4,959,656 | A | * | 9/1990 | Kumar | ............... 342/418 |
|---|---|---|---|---|---|
| 5,920,278 | A | | 7/1999 | Tyler et al. | |
| 5,945,949 | A | | 8/1999 | Yun | |
| 6,236,365 | B1 | | 5/2001 | LeBlanc et al. | |
| 2005/0181731 | A1 | * | 8/2005 | Asghar et al. | ............... 455/63.1 |

FOREIGN PATENT DOCUMENTS

| DE | 101 14 052 C1 | 7/2002 |
|---|---|---|
| DE | 10 2004 032 222 A1 | 1/2006 |
| DE | 10 2004 207 666 A1 | 2/2006 |

OTHER PUBLICATIONS

"Lokalisierung von Mobilstationen anhand ihrer Runkmeβdaten", Olrik Kennemann, Verlag der Sugustinus Buchhandlung, 1997, pp. 35-41, 63-81 and 141-156.

"Exact cochannel interference analysis for log-normal shadowed Rician fading channels", M.D. Austin and G.L. Stüber, Electronics Letters, 1994, vol. 30, No. 10, p. 748.

* cited by examiner

*Primary Examiner*—Dao L. Phan
(74) *Attorney, Agent, or Firm*—Eschweiler & Associates, LLC

(57) ABSTRACT

The invention relates to a receiver in a position-finding system, having a calculation unit for calculating a statistical value from a received signal, and a detector unit for comparing the statistical value with a threshold value and for determining whether the signal is a synchronized position-finding signal. The system also includes an estimation unit for estimating the quotient of the signal-carrier power and the noise-power spectral density of the signal, and a determination unit for threshold-value determination from the estimated quotient.

23 Claims, 11 Drawing Sheets

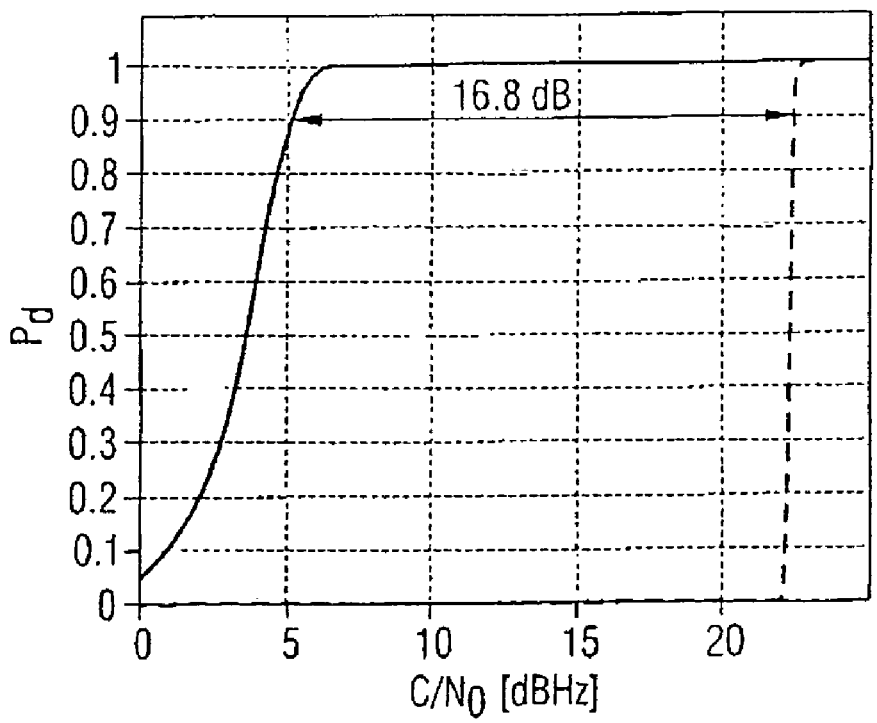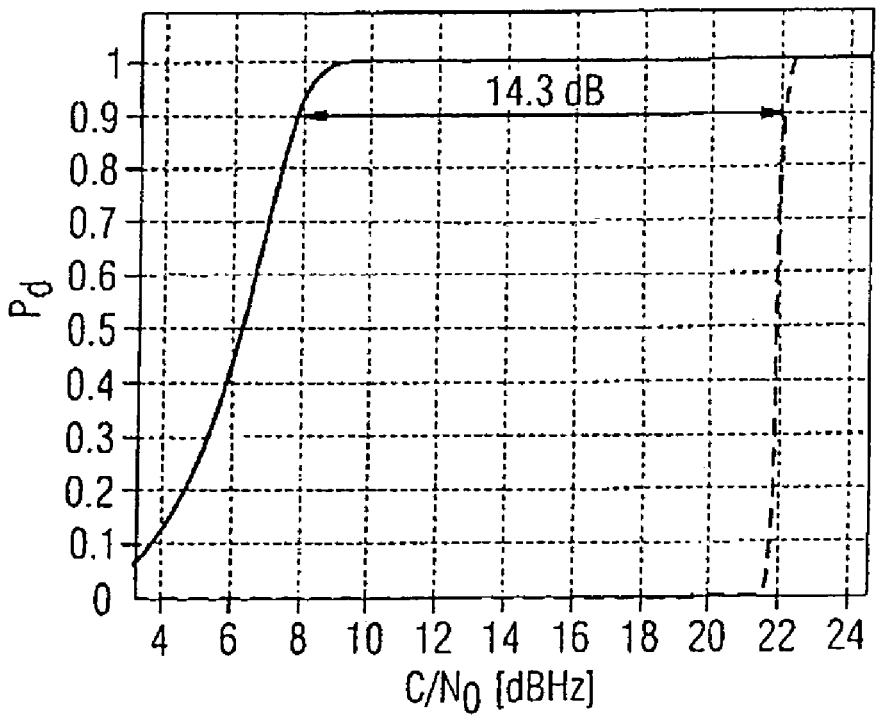

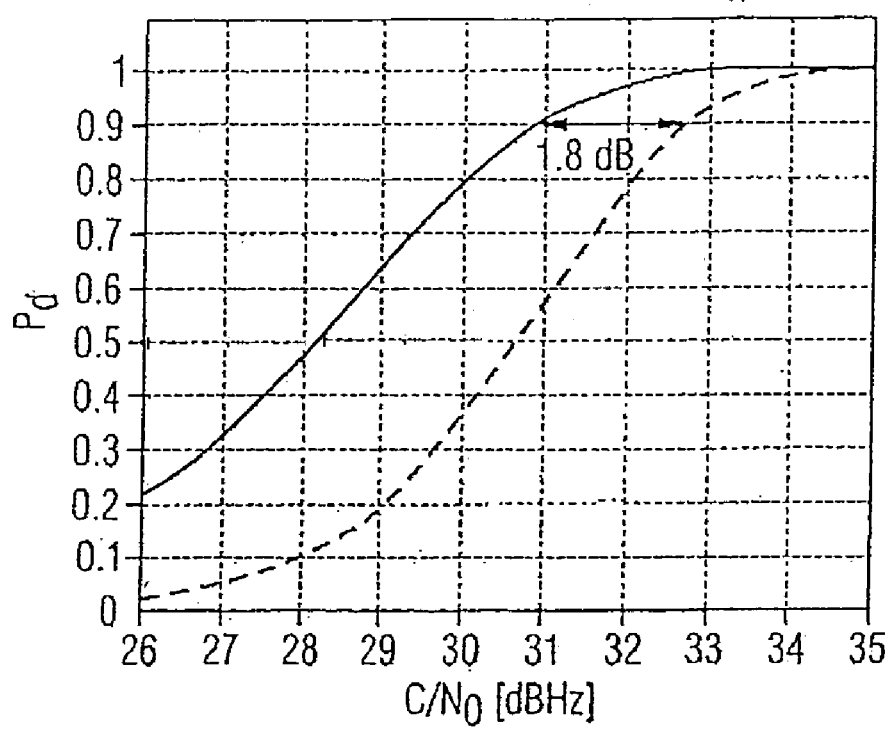
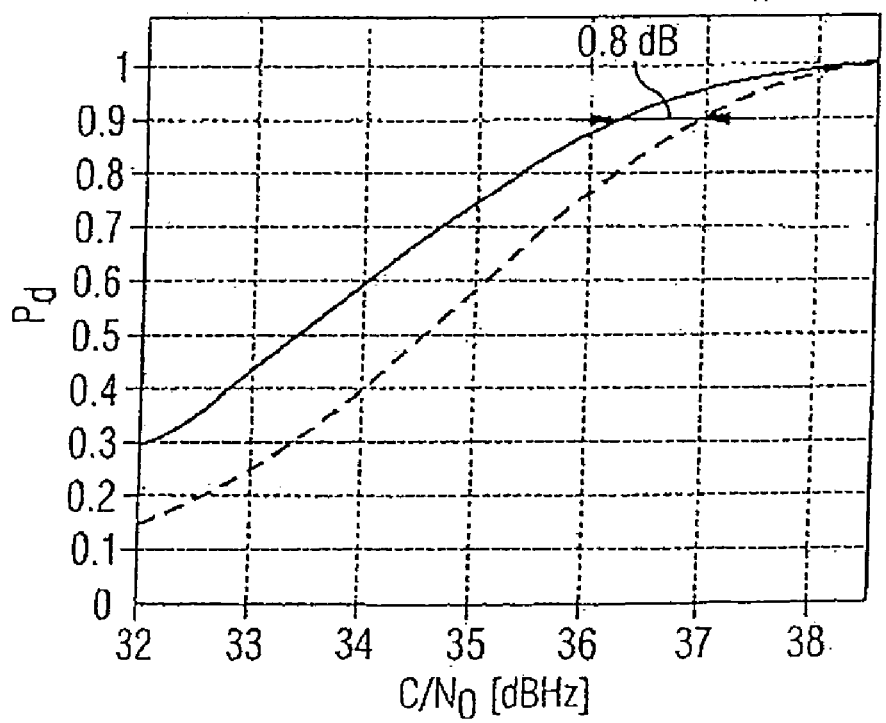

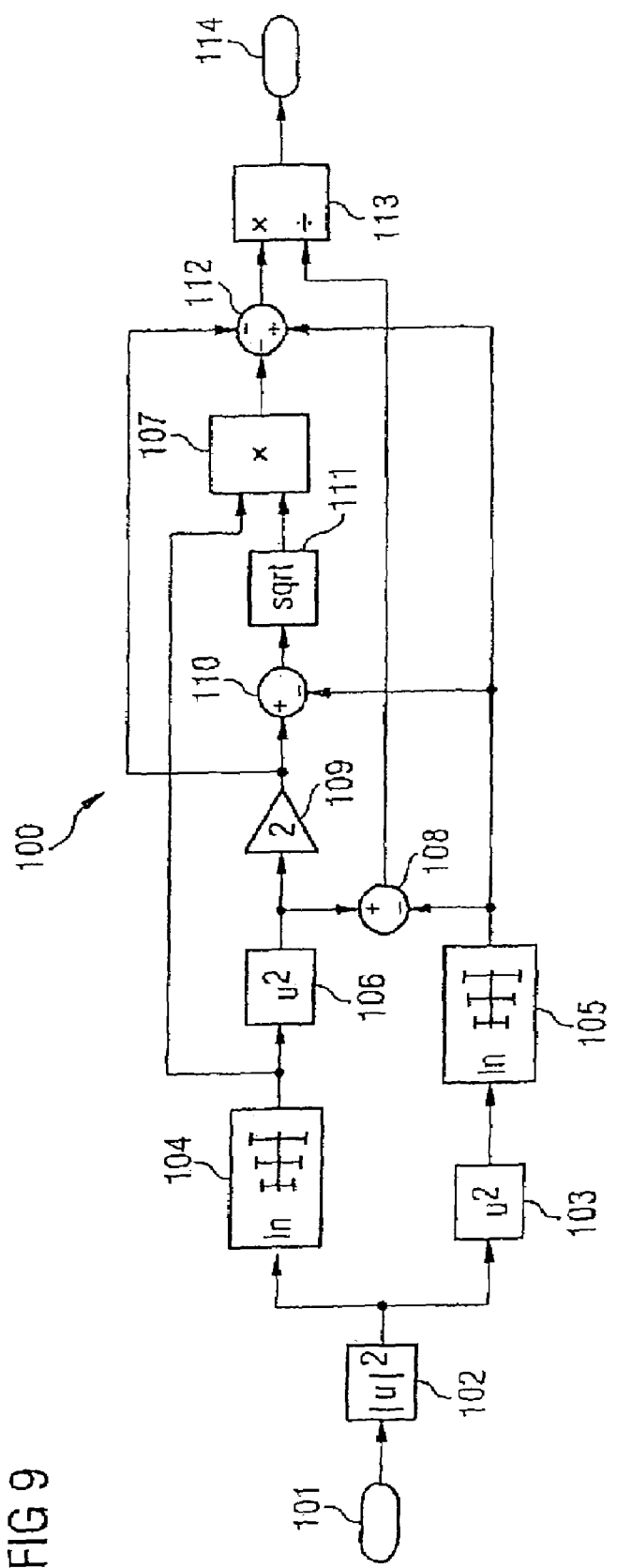

1

RECEIVER IN A POSITION-FINDING SYSTEM AND METHOD FOR POSITION-FINDING WITH INCREASED SENSITIVITY

REFERENCE TO RELATED APPLICATIONS

This application claims the benefit of the priority date of German application DE 10 2004 035 608.4, filed on Jul. 22, 2004, the contents of which are herein incorporated by reference in their entirety.

FIELD OF THE INVENTION

The invention relates to a receiver in a position-finding system, and also a method for finding the position of a receiver in a position-finding system.

BACKGROUND OF THE INVENTION

It has been known for some time that position-finding can be carried out on the basis of radio links, for example within the satellite-assisted GPS (Global Positioning System) system. The European satellite navigation system Galileo, and also positioning methods based on terrestrial radio sources, afford further applications. Such position-finding methods and appropriate appliances allow the user to find his position by measuring the distance to a particular number of wireless signal sources such as satellites or base stations. By way of example, each GPS and Galileo satellite transmits unique digital sequences, which include a time identifier and the satellite position. The signals are usually coded using long spread codes. The spread codes for the individual satellites are virtually orthogonal with respect to one another, so that the signals can be distinguished from one another in the receiver. By way of example, the spread codes for the various GPS and Galileo satellites are synchronized to one another using high-precision atomic clocks installed in the satellites.

The receiver evaluates the relative delays between the signal transmission from various radio sources (GPS satellites, Galileo satellites or terrestrial transmitters) and ascertains delay time offsets therefrom. Together with the data about the position and the time reference of the various radio sources, the delay time offsets can be used to locate the receiver exactly. To this end, the receiver calculates the "pseudo-ranges", which represent the distance to each radio source. Navigation software can then calculate the user position on the basis of the pseudo-range to each radio source and the position of the radio sources by solving a set of non-linear equations.

Many receivers customary today in position-finding systems are based on the practice of despreading the samples of the received spread-coded position-finding signals at first and then subjecting them to coherent and to non-coherent integration. The resultant statistical values are supplied to a detector, for example a Neyman-Pearson detector, which maximizes the probability of identifying the position-finding signals according to the desired requirements.

The detector compares the statistical values supplied to it with a threshold value. If a statistical value is greater than the threshold value, it is assumed that a position-finding signal has been received. In the opposite case, the received signal is not classified as a position-finding signal. This is intended to prevent signals which are not position-finding signals from being used for position-finding. In addition, this method also prevents position-finding signals with too small a reception amplitude from being used for position-finding.

One problem is that the individual position-finding signals do not always reach the receiver along a direct line-of-sight (LOS) path, but rather are often attenuated by a wide variety of obstacles. These obstacles include the walls and ceilings of buildings, coated windows, bodywork of motor vehicles, sources of shade and treetops. Since the various satellites in satellite navigation systems are distributed as far as possible from one another in prescribed arrangements, the various position-finding signals emitted by the individual satellites reach the receiver from totally different directions. The position-finding signals reaching the receiver on various transmission paths are therefore attenuated in different ways. By way of example, while position-finding signals emitted from one satellite have to pass through a wall, which attenuates them by 25 dB, in order to reach the receiver, the position-finding signals coming from another satellite may reach the receiver via a line-of-sight path. This may result in position-finding signals no longer being identified as such by the detector on account of their attenuation or in the receiver considering signals which are not position-finding signals to be position-finding signals.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present one or more concepts of the invention in a simplified form as a prelude to the more detailed description that is presented later.

The invention is directed to a receiver for a position-finding system and associated method which has a higher level of sensitivity than conventional receivers.

The inventive receiver is part of a position-finding system. The principle underlying the position-finding system is based on position-finding signals being emitted by a plurality of transmitters and then being received by the receiver. The receiver uses a position-finding signal which it has received to identify the transmitter from which the position-finding signal was emitted and the time at which the position-finding signal was emitted. For the situation in which the transmitters are not arranged at a fixed location, the position-finding signal is used to derive the location at which the transmitter in question was situated at the transmission time. Since the receiver knows the times at which position-finding signals were received from different transmitters, it can use the propagation-time differences in the individual position-finding signals to ascertain its precise position.

The inventive receiver has a calculation unit which calculates a statistical value from a received signal. The statistical value is supplied to a detector unit which compares the statistical value with a threshold value. Using the result of this comparison, the detector unit is able to determine whether the received signal is a synchronized position-finding signal. In addition, provision may also be made for the detector unit to use the threshold-value comparison to decide whether a received position-finding signal is used to find the position of the receiver. This is because a situation may arise in which the position-finding signal has been attenuated during transmission from the transmitter to the receiver such that it can be distinguished from noise only inadequately when it is received. In this respect, the inventive receiver corresponds to conventional receivers in position-finding systems.

Unlike conventional receivers, however, the inventive receiver also has an estimation unit and a determination unit. The estimation unit is used to estimate the ratio of the signal-carrier power C to the noise-power spectral density $N_0$ of the received signal.

Using the estimated ratio of the signal-carrier power to the noise-power spectral density of the received signal, the determination unit determines the threshold value, which is then used by the detector unit for the threshold-value comparison. The estimation of said ratio and the subsequent adaptation of the threshold value are performed for every received signal, in particular.

In comparison with conventional receivers in position-finding systems, the inventive receiver has the advantage of a relatively high level of sensitivity. The relatively high level of sensitivity is obtained from the dependency of the threshold value on the quotient $C/N_0$.

If a position-finding signal is attenuated, for example during radio transmission, so greatly that the statistical value ascertained from the received synchronized position-finding signal is less than the threshold value which has been set, then the received synchronized position-finding signal would not be identified as such by the receiver. In the opposite case, i.e. if the threshold value is too small, noise signals or unsynchronized signals could be incorrectly considered to be position-finding signals.

The invention makes use of the appreciation by the inventors that the ratio of the signal-carrier power to the noise-power spectral density of a received signal indicates the attenuation which the signal has experienced upon being transmitted from the transmitter to the receiver. Using this ratio, the threshold value can therefore be set such that the probability of a received synchronized position-finding signal being detected is maximized.

The inventive advantage of the increased sensitivity for the detection of position-finding signals applies both to multipath signal propagation, where the position-finding signals cover a longer path in comparison with the line-of-sight path on account of reflections before they are received by the receiver, and to signal transmission via the line-of-sight path.

In one embodiment, the determination unit is configured to calculate the probability density (probability density function), which the received signal has after processing in the receiver as a result of coherent and non-coherent integration, from the estimation quotient $C/N_0$. Next, the threshold value of the detector is calculated from the probability density taking into account the estimated quotient $C/N_0$.

As an alternative embodiment, the determination unit is configured to read the threshold value from a table after it has calculated the probability density. This table contains the values of the probability density with the associated threshold values. The table is preferably created before position-finding is carried out.

A further alternative for determining the threshold value is formed by a table which directly lists the detector threshold values for the estimated quotients $C/N_0$. This table is created, in one example, on the basis of previously calculated probability densities before position-finding is carried out.

In line with one embodiment of the inventive receiver, a value for the misdetection probability is firmly prescribed. The misdetection probability is the probability that a signal which is not a synchronized position-finding signal is incorrectly considered by the detector unit to be a position-finding signal. This happens, by way of example, when the random noise produced by non-position-finding signals is combined so unfortunately that it produces a statistical value which is above the threshold value. In one embodiment of the inventive receiver, the calculation of the threshold value includes not only the estimated quotient $C/N_0$ but also the value for the misdetection probability.

In another embodiment of the inventive receiver, the calculation unit includes a series circuit which comprises a first integrator for coherent integration, an absolute-value squaring unit or absolute-value formation unit and a second integrator for non-coherent integration. Samples of the received signal which are produced by an analogue/digital converter are input into the series circuit. The statistical values can be tapped off at the output of the series circuit.

In one embodiment, it is advantageous if the transmitters spread-code the position-finding signals. In this case, the calculation unit has a unit for despreading the received signal.

There are a plurality of options available for decoupling values from which the quotient $C/N_0$ is intended to be estimated from the reception path according to the invention. By way of example, the statistical values generated by the calculation unit are supplied to the estimation unit in order to derive the quotient $C/N_0$ therefrom. Alternatively, the values produced by the despreading unit are supplied to the estimation unit.

In another embodiment of the invention a further estimation unit is provided, which is used to estimate the Rice factor of the radio link via which the received signal was transmitted. The estimated Rice factor is taken into account when the threshold value is determined by the determination unit.

The Rice factor is characteristic of the strength of a signal transmitted via a line-of-sight path relative to the strength of the signals transmitted via non-line-of-sight paths. In the case of multipath signal propagation, the Rice factor is therefore a measure of the quality or reliability of the radio link for the position-finding which is to be carried out. The Rice factor is proportional to the ratio between the signal strength of the line-of-sight component and the variance of the multipath component. Taking into account the Rice factor results in a further increase in the sensitivity of the receiver for detection of position-finding signals.

To estimate the Rice factor, the methods can be used which are indicated in the U.S. patent application Ser. No. 11/146,647, entitled "Improving the reliability and accuracy of position-finding methods by estimating the Rice factor of a radio link," which is incorporated by reference herein in its entirety.

In addition, U.S. patent application Ser. No. 11/174,211, entitled "Receiver in a position-finding system with improved sensitivity", discloses a receiver in a position-finding system in which the threshold value is adapted using the estimated Rice factor. Said application is incorporated by reference herein in it entirety.

In one example, the ratio of the signal-carrier power to the noise-power spectral density of the received signal is estimated by the estimation unit in accordance with the following equation:

$$\frac{\hat{C}}{\hat{N}_0} = \frac{\sqrt{2 \cdot (E\{|y_v|^2\})^2 - E\{|y_v|^4\}}}{T_s \cdot \left(E\{|y_v|^2\} - \sqrt{2 \cdot (E\{|y_v|^2\})^2 - E\{|y_v|^4\}}\right)} \quad (1)$$

In Equation (1), $T_s$ represents the period used to sample the received signal, and $y_v$ represents the complex envelope of the received signal in baseband. The expected value $E\{x\}$ is approximated by continuous averaging of x.

The Rice factor can be determined, by way of example, from Equations (2) and (3) which are shown below, where R is the amplitude of samples of the received signal, and $\hat{E}\{x\}$ is approximated by continuous averaging of x:

$$\hat{K}_5 \approx \frac{\hat{E}\{R^2\} - 2 \cdot \hat{E}\{(R - \hat{E}\{R\})^2\}}{2 \cdot \hat{E}\{(R - \hat{E}\{R\})^2\}} \quad (2)$$

$$\hat{K}_{2,4} = \frac{\hat{E}\{R^4\} - 2 \cdot (\hat{E}\{R^2\})^2 - \hat{E}\{R^2\} \cdot \sqrt{2 \cdot (\hat{E}\{R^2\})^2 - \hat{E}\{R^4\}}}{(\hat{E}\{R^2\})^2 - \hat{E}\{R^4\}} \quad (3)$$

The position-finding system may be a satellite-assisted system. In this case, the transmitters are fitted on the satellites used in the respective system. In particular, the position-finding system may be a GPS system, a GLONASS system or a Galileo system. Alternatively, it may, in principle, be a purely terrestrial position-finding system with terrestrial radio sources. Such position-finding systems may be based, by way of example, on the evaluation methods "time of arrival" (TOA), "time difference of arrival" (TDOA) or "enhanced observed time difference" (E-OTD). Said evaluation methods may also be implemented in American, European or Asian mobile radio systems, such as GSM, GPRS, EDGE, UMTS, DCS-1800, IS-136, IS-95, PCS-1900, CDMA-2000 and PDC.

The inventive method is used for finding the position of a receiver belonging to a position-finding system.

In the inventive method of the present invention, a statistical value is compared with a threshold value. To this end, the statistical value is first of all calculated from a signal received by the receiver. In addition, the ratio of the signal-carrier power to the noise-power spectral density of the received signal is estimated. This estimated ratio is used to set the threshold value. In this case, the threshold value is set such that the probability of a received synchronized position-finding signal being detected is maximized. Next, the result of said comparison is used to determine whether the received signal is a synchronized position-finding signal and/or whether the received signal is used to find the position of the receiver.

The inventive method has the same advantages over conventional methods for position-finding as the inventive receiver.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

The invention is explained in more detail below by way of example with reference to the drawings, in which:

FIGS. 3a to 3j are plots illustrating the probability $P_d$ of detection of the position-finding signal as a function of the quotient $C/N_0$ of the signal-carrier power C and the noise-power spectral density $N_0$;

FIG. 9 is a block diagram illustrating an estimation apparatus 100 for estimating the Rice factor K according to another embodiment of the invention.

DETAILED DESCRIPTION OF THE INVENTION

Figure 1:
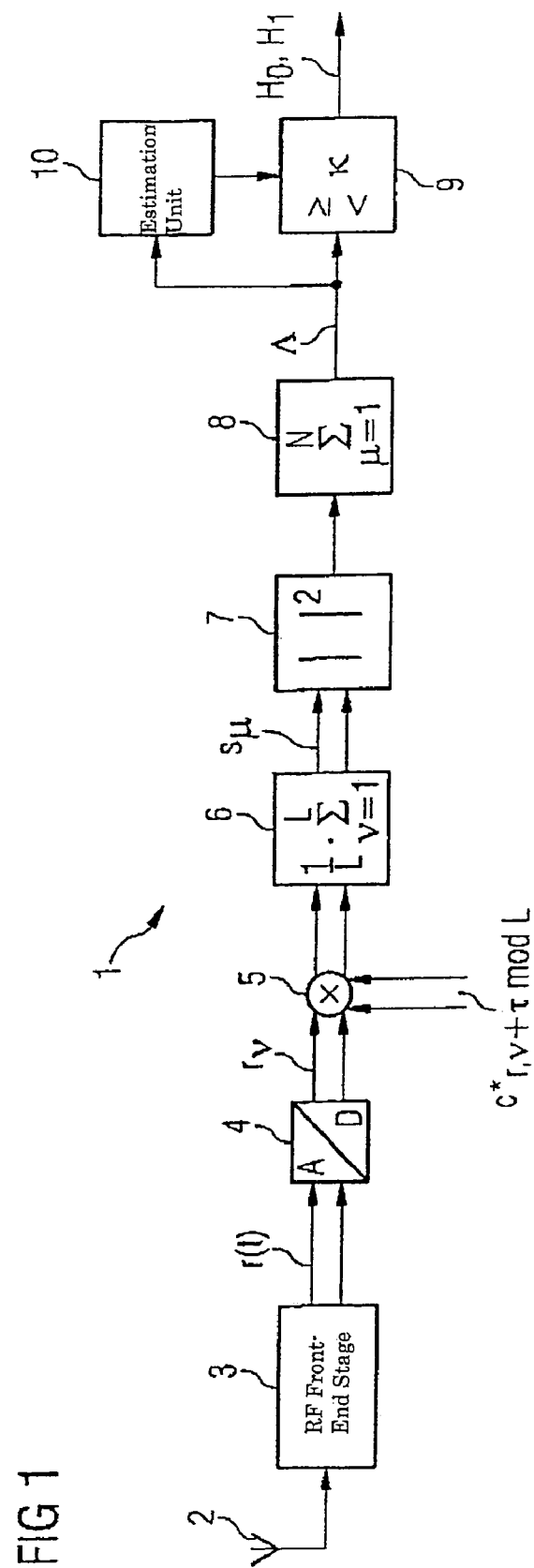
FIG. 1 is a block diagram illustrating a receiver 1 according to a first exemplary embodiment of the inventive receiver.

FIG. 1 shows the block diagram of a receiver 1 in a position-finding system. In the present case, this is a GPS system. The position-finding signals emitted by the satellites in the GPS system are received by an antenna 2. The antenna 2 has an RF frontend stage 3 connected downstream of it. The RF frontend stage 3 outputs the quadrature components of the complex envelope r(t) of a received position-finding signal in baseband:

$$r(t) = \sqrt{2C} \cdot d(t) \cdot c(t) \cdot \exp(j \cdot \Delta\phi(t)) + n(t) \quad (4)$$

In Equation (4), d(t) represents the data signal, c(t) represents the received spread code, $\Delta\phi(t) = \phi(t) - \phi_r(t)$ represents the phase offset between the received signal phase (t) and the reference phase $\phi_r(t)$, and n(t) represents the complex-value additive white Gaussian noise (AWGN) with an average of zero.

Following the processing by the RF frontend stage 3, the received position-finding signal is sampled by an analogue-digital converter 4 arranged downstream of the RF frontend stage 3 at times $v(v \in Z)$. The samples $r_v$ are despread by virtue of a multiplier 5 multiplying them by the complex-conjugate local PRN reference spread code $c^*_{r,v+\tau modL}$. The resultant products are summed in a coherent integrator 6 in accordance with the following Equation (5):

$$s_\mu = \frac{1}{L} \cdot \sum_{v=1}^{L} r_v \cdot c^*_{r,v+\tau \bmod L} \quad (5)$$

-continued $$= \sqrt{2C} \cdot d_\mu \cdot \frac{1}{L} \cdot \sum_{v=1}^{L} c_v \cdot c^*_{r,v+\tau \bmod L} \cdot \exp(j \cdot \Delta\varphi_v) + \frac{1}{L} \cdot \sum_{v=1}^{L} n_v \cdot c^*_{r,v+\tau \bmod L}$$

The parameter $L=T_c/T_s$ ($L \in \mathbb{N}$) indicates the ratio between the coherent integration time $T_c$ and the sampling period $T_s$.

By performing the summation in Equation (5), the following is obtained:

$$s_\mu = \sqrt{2C} \cdot d_\mu \cdot \frac{1}{L} \cdot R_{rc}(\tau) \cdot si\left(\Delta\omega \cdot \frac{T_c}{2}\right) \cdot \exp(j \cdot \Delta\Phi) + w_\mu \quad (6)$$

In Equation (6), $R_{rc}(\tau)$ indicates the circulation cross-correlation function between $c_v$ and $c_{r,v+\tau mod L}$, $\Delta\omega$ indicates the frequency offset after the Doppler removal, and $w_\mu = w_{I,\mu} + j \cdot w_{Q,\mu}$ indicates the resultant complex-value additive white Gaussian noise with an average of zero. For the expected values $E\{w_I^2\}$ and $E\{w_Q^2\}$, the following applies:

$$E\{w_I^2\} = E\{w_Q^2\} \quad (7)$$
$$= E\left\{\left(\frac{1}{L} \cdot \sum_{v=1}^{L} n_I \cdot c^*_{r,v+\tau \bmod L}\right)^2\right\}$$
$$= E\left\{\left(\frac{1}{L} \cdot \sum_{v=1}^{L} n_Q \cdot c^*_{r,v+\tau \bmod L}\right)^2\right\}$$
$$= \sigma_w^2$$
$$= \frac{N_0}{T_c}$$

The values $s_\mu$ which are output by the coherent integrator 6 are supplied to an absolute-value squaring unit or absolute-value formation unit 7 and then to a non-coherent integrator 8. During non-coherent integration, $N=T_n/T_c$ values are summed, where $T_n$ indicates the non-coherent integration time. By dividing Equation (6) by $\sigma_w^2$, the inphase component $w_I$ and the quadrature component $w_Q$ of the additive white Gaussian noise adopt a standard normal distribution with a variance of one. The non-coherent integrator 8 outputs the following statistical value $\Lambda_{AWGN}$:

$$\Lambda_{AWGN} = \sum_{\mu=1}^{N} \frac{|s_{AWGN,\mu}|^2}{\sigma_w^2} \overset{H_1}{\underset{H_0}{\gtrless}} \kappa_{AWGN} \quad (8)$$

A downstream detector 9 compares the statistical value $\Lambda_{AWGN}$ with a threshold value $\kappa_{AWGN}$. If $\Lambda_{AWGN} \geq \kappa_{AWGN}$, then it is assumed that a hypothesis $H_1$ applies according to which the received signal is a position-finding signal which is emitted by a satellite and which has the tested code phase $\tau$. In the opposite case, namely when $\Lambda_{AWGN} < \kappa_{AWGN}$, a hypothesis $H_0$ applies which states that the signal received on the antenna 2 is not a synchronized position-finding signal which has the tested code phase $\tau$.

The manner of operation of the detector 9 is based on the Neyman-Pearson criterion, which maximizes the probability of detection of the position-finding signal, provided that a fixed rate has been prescribed for misdetection, where a signal is incorrectly considered to be the synchronized position-finding signal with the tested code phase $\tau$.

The probability $P_f$ for misdetection is calculated as follows:

$$P_f = \int_\kappa^\infty P_{\Lambda|H_0}(s \mid H_0) ds \quad (9)$$

The threshold value $\kappa$ is calculated from Equation (9) by prescribing a fixed value, for example $10^{-3}$, for the probability $P_f$.

The probability $P_d$ of detection of the position-finding signal is given by the following equation:

$$P_f = \int_\kappa^\infty P_{\Lambda|H_1}(s \mid H_1) ds \quad (10)$$

The above equations result in a non-central $\chi^2$ distribution function for the probability density (probability density function) $p_\Lambda$:

$$p_{\Lambda_{AWGN}}(s) = \frac{1}{\sigma_w} \cdot \chi_M^2\left(\frac{s}{\sigma_w}, \gamma^2\right) \quad (11)$$
$$= \frac{1}{2\sigma_w} \cdot \left(\frac{s}{\sigma_w \cdot \gamma^2}\right)^{\frac{M-2}{4}} \cdot \exp\left(-\frac{s}{2\sigma_w} - \frac{\gamma^2}{2}\right) \cdot I_{\frac{M}{2}-1}\left(\sqrt{\frac{s \cdot \gamma^2}{\sigma_w}}\right)$$

$I_{M/2-1}(x)$ is the modified Bessel function of the first type and of $(M/2-1)$th order. The number $M_{AWGN}$ of degrees of freedom for the $\chi^2$ distribution function from Equation (11) and the non-centrality parameter $\gamma_{AWGN}^2$ are calculated as follows:

$$M_{AWGN} = 2 \cdot \frac{T_n}{T_c} \quad (12)$$

$$\gamma_{AWGN}^2 = \sum_{v=1}^{M} \gamma_v^2 \quad (13)$$
$$= \sum_{\mu=1}^{\frac{T_n}{T_c}} \frac{1}{\sigma_w^2} \cdot [E\{\text{Re}\{s_{AWGN,\mu}\}\}^2 + E\{\text{Im}\{s_{AWGN,\mu}\}\}^2]$$
$$= \frac{C}{N_0} \cdot 2T_n \cdot \frac{1}{L^2} \cdot R_{rc}^2(\tau) \cdot si^2\left(\Delta\omega_\mu \cdot \frac{T_c}{2}\right)$$

The invention provides for the quotient $C/N_0$ of the signal-carrier power $C$ and the noise-power spectral density $N_0$ to be estimated and for the quotient $C/N_0$ to be used to ascertain the optimum threshold value $\kappa$ for which the detection probability of a received synchronized position-finding signal is maximized. For the noise-power spectral density $N_0$, $N_0 = k \cdot T_0$, with $k = 1.38 \cdot 10^{-23}$ J/K being the Boltzmann constant and $T_0 = 290$ K being the room temperature. The optimum threshold value $\kappa$ can be calculated using the Equations (7), (9), (11) and (13), provided that a fixed value, for example $10^{-3}$, is prescribed for the probability $P_f$ in line with the Neyman-Pearson criterion. To estimate the quotient $C/N_0$, the estimation unit 10 is provided in FIG. 1. The threshold value $\kappa$ can be determined either in the estimation unit 10 or the detector 9.

Figure 2:
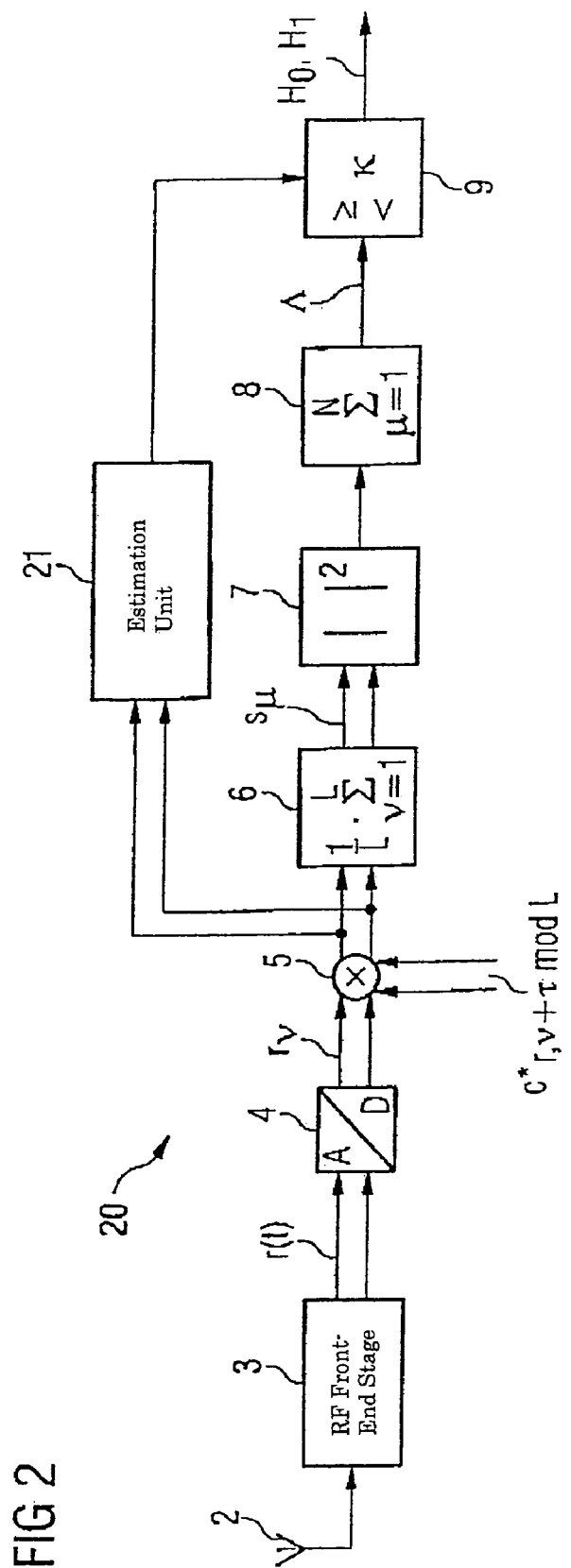
FIG. 2 is a block diagram illustrating a receiver 20 according to a second exemplary embodiment of the inventive receiver.
Figure 3C:
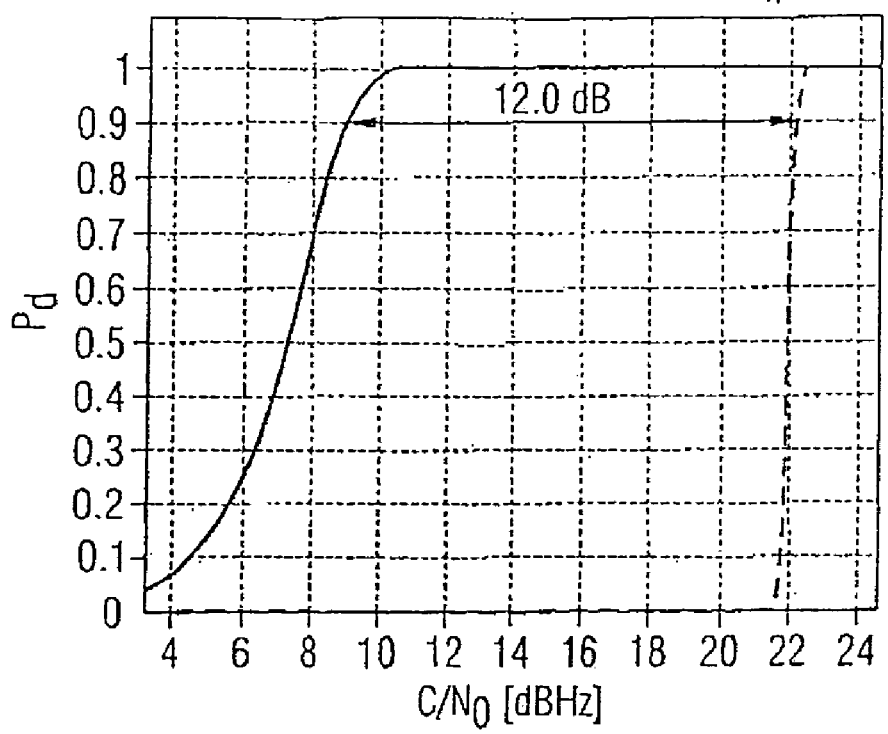
Figure 3D:
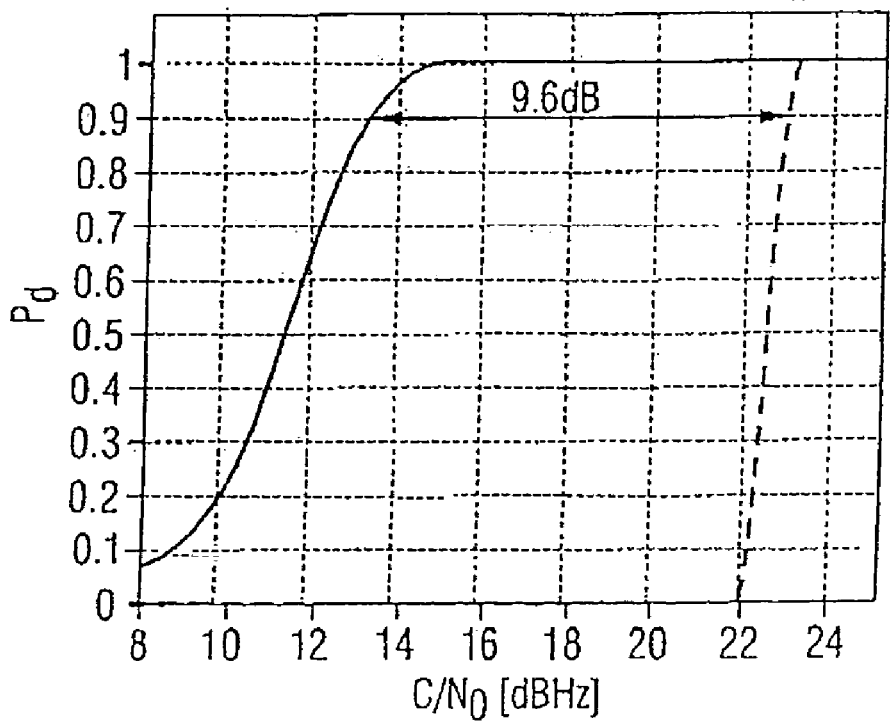
Figure 3E:
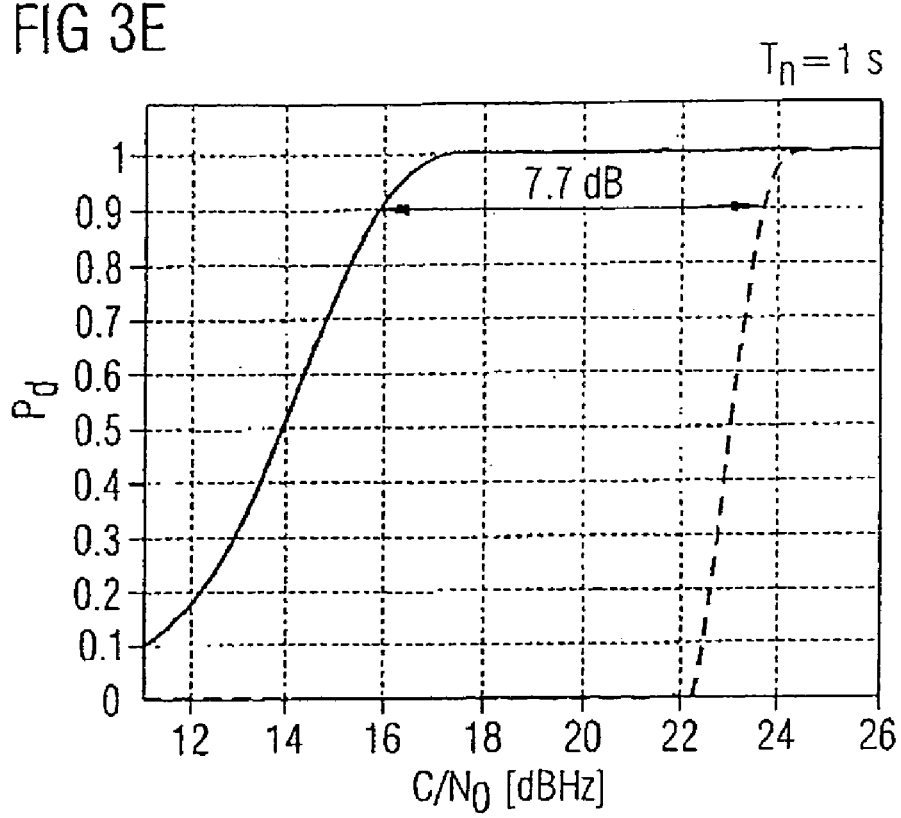
Figure 3F:
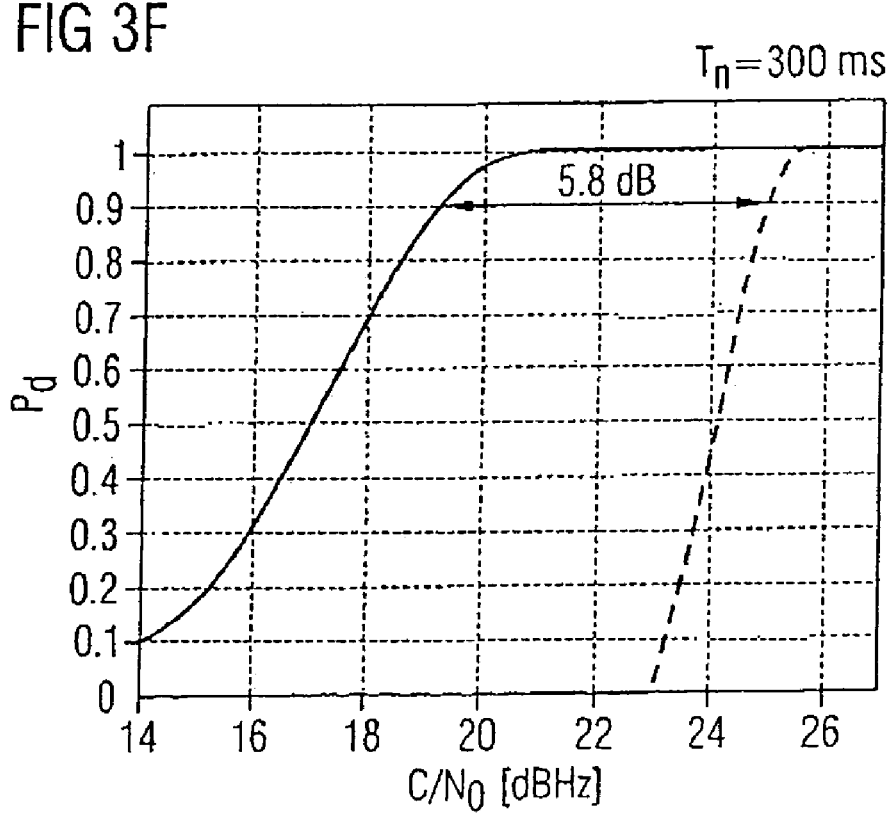
Figure 3G:
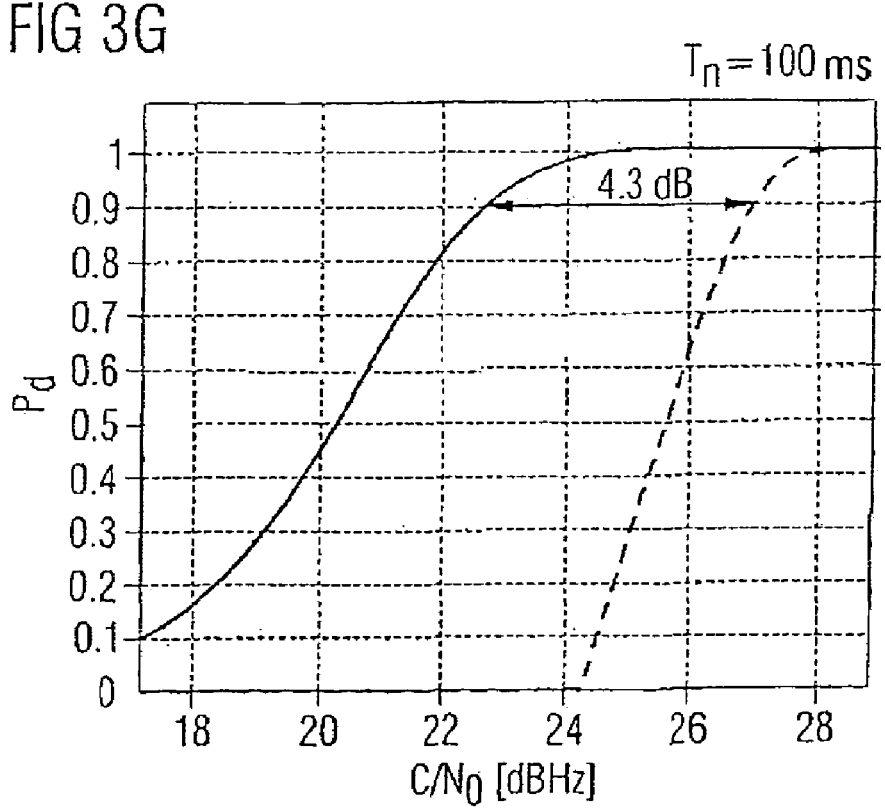
Figure 3H:
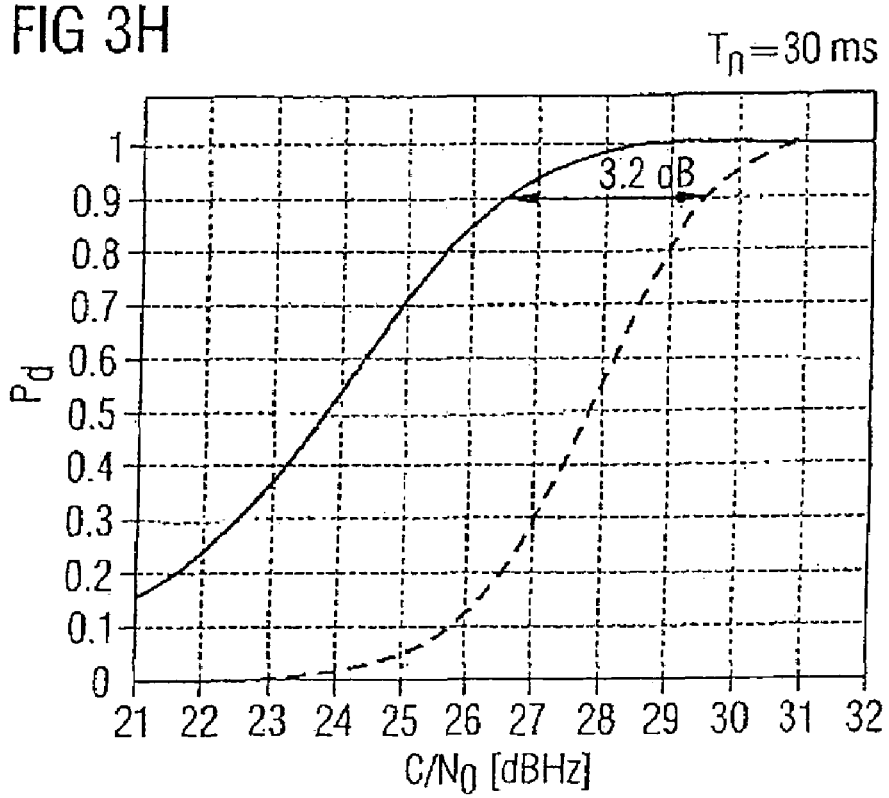

In FIG. 1, the estimation unit 10 is fed by the non-coherent integrator 8. Alternatively, an estimation unit for estimating the quotient $C/N_0$ may also be connected downstream of the multiplier 5. The block diagram of such a receiver 20 is shown in FIG. 2. The receiver 20 differs from the receiver 1 shown in FIG. 1 only by virtue of the arrangement of the estimation unit 21 and the correspondingly different internal design of the estimation unit 21 in comparison with the estimation unit 10. As an alternative to the two aforementioned options, the estimation unit may also be fed by the coherent integrator 6 or by the absolute-value squaring unit or absolute-value formation unit 7.

The equations described above are based on an AWGN channel model. The invention is valid for any channel models, however. The invention will now be applied to the Ricean and Rayleigh channel models by way of example.

If the received signal has a dominant, steady, i.e. non-fading, signal component such as the line-of-sight signal, the envelope of the received signal obeys a Ricean distribution. In addition, the Ricean multipath channel produces a complex-value white Gaussian noise variable u with an average of zero, which variable appears in the determination equation for the envelope r(t) of the received position-finding signal as a multiplicative factor. For the envelope x of the variable u, the following applies:

$$x = |u| = \sqrt{u_I^2 + u_Q^2} \tag{14}$$

According to "Probability, Random Variables and Stochastic Processes" by A. Papoulis and A. U. Pillai, appearing in McGraw-Hill, New York, 2002, the envelope x conforms to the following Ricean fading distribution $p_x(x)$:

$$p_x(x) = \frac{x}{\sigma_u^2} \cdot \exp\left(-\frac{x^2 + A_u^2}{2\sigma_u^2}\right) \cdot I_0\left(\frac{A_u \cdot x}{\sigma_u^2}\right) \tag{15}$$

$I_0(x)$ is the modified Bessel function of the first type and zeroth order. $A_u^2$ is the signal strength of the line-of-sight component:

$$A_u^2 = E\{u_I\}^2 + E\{u_Q\}^2 \tag{16}$$

The Rice factor K is defined as the ratio between the signal strength of the line-of-sight component and the variance of the multipath component:

$$K = \frac{A_u^2}{2\sigma_u^2} \tag{17}$$

This gives the following for the complex envelope of the Ricean multipath channel in baseband:

$$r(t) = \sqrt{2C} \cdot d(t) \cdot c(t) \cdot \exp(j \cdot \Delta\phi(t)) \cdot u(t) + n(t) \tag{18}$$

In addition, the following apply:

$$E\{|u|^2\} = A_u^2 + 2\sigma_u^2 = 1 \tag{19}$$

$$E\{u_I^2\} = E\{u_Q^2\} = \frac{1}{2} \tag{20}$$

$$E\{u_I\} = E\{u_Q\} = \sigma_u \cdot \sqrt{K} = \sqrt{\frac{K}{2 \cdot (K+1)}} \tag{21}$$

$$E\{(u_I - E\{u_I\})^2\} = E\{(u_Q - E\{u_Q\})^2\} = \sigma_u^2 = \frac{1}{2 \cdot (K+1)} \tag{22}$$

For the values $s_\mu$ which are output from the coherent integrator 6, the following equation applies in the case of a Ricean distribution:

$$s_\mu = \sqrt{2C} \cdot d_\mu \cdot \frac{1}{L} \cdot R_{rc}(\tau) \cdot si\left(\Delta\omega \cdot \frac{T_c}{2}\right) \cdot \exp(j \cdot \Delta\Phi) \cdot u_\mu + w_\mu \tag{23}$$

The addition of the two Gaussian variables with averages not equal to zero in Equation (23) produces a further Gaussian variable with an average not equal to zero. The Gaussian variable produced by said addition can be normalized in order to produce a normal distribution not equal to zero and with a variance of one.

The threshold-value decision to be made by the detector 9 has the following form:

$$\Lambda_{Rice} = \sum_{\mu=1}^{N} \frac{|s_{Rice,\mu}|^2}{\sigma_{Ri}^2} \begin{array}{c} H_1 \\ \geq \\ < \\ H_0 \end{array} \kappa_{Rice} \tag{24}$$

For $\sigma_{Ri}^2$, the following applies:

$$\sigma_{Ri}^2 = C \cdot \frac{1}{L^2} \cdot R_{rc}^2(\tau) \cdot si^2\left(\Delta\omega \cdot \frac{T_c}{2}\right) \cdot \frac{1}{K+1} + \frac{N_0}{T_c} \tag{25}$$

The above equations result in a non-central $\chi^2$ distribution function for the probability density (probability density function) $p_{\Lambda_{Rice}}$:

$$p_{\Lambda_{Rice}}(s) = \frac{1}{\sigma_{Ri}} \cdot \chi_M^2\left(\frac{s}{\sigma_{Ri}}, \gamma^2\right) \tag{26}$$

$$= \frac{1}{2\sigma_{Ri}} \cdot \left(\frac{s}{\sigma_{Ri} \cdot \gamma^2}\right)^{\frac{M-2}{4}} \cdot$$

$$\exp\left(-\frac{s}{2\sigma_{Ri}} - \frac{\gamma^2}{2}\right) \cdot I_{\frac{M}{2}-1}\left(\sqrt{\frac{s \cdot \gamma^2}{\sigma_{Ri}}}\right)$$

$I_{M/2-1}(x)$ is the modified Bessel function of the first type and of (M/2−1)th order. The number $M_{Rice}$ of degrees of freedom for the $\chi^2$ distribution function from Equation (26) and the non-centrality parameter $\lambda_{Rice}^2$ are calculated as follows:

$$M_{Rice} = 2 \cdot \frac{T_n}{T_c} \tag{27}$$

-continued $$\gamma_{Rice}^2 = \sum_{v=1}^{M} \gamma_v^2 \qquad (28)$$

$$= \sum_{\mu=1}^{\frac{T_n}{T_c}} \frac{1}{\sigma_{Ri}^2} \cdot [E\{\text{Re}\{s_{Rice,\mu}\}\}^2 + E\{\text{Im}\{s_{Rice,\mu}\}\}^2]$$

$$= \sum_{\mu=1}^{\frac{T_n}{T_c}} \frac{1}{\sigma_{Ri}^2} \cdot C \cdot \left(\frac{1}{L} \cdot R_{rc}(\tau)\right)^2 \cdot si^2\left(\Delta\omega_\mu \cdot \frac{T_c}{2}\right) \cdot \frac{K}{K+1}$$

$$= \frac{K \cdot T_n}{T_c} \cdot \left(1 + \frac{N_0 \cdot (K+1)}{T_c \cdot C \cdot R_{rc}^2(\tau_\mu) \cdot si^2\left(\Delta\omega_\mu \cdot \frac{T_c}{2}\right)}\right)^{-1}$$

If the dominant line-of-sight signal becomes weaker, the Ricean distribution degenerates to a Rayleigh distribution, and the Rice factor K adopts the value zero. For a Rayleigh distribution, the determination equation for the probability density $P_{A_{Rayliegh}}$ has the following form:

$$p_{A_{Rayleigh}}(s) = \frac{1}{\sigma_{Re}} \cdot \chi_M^2\left(\frac{s}{\sigma_{Ra}}\right) \qquad (29)$$

$$= \frac{1}{2\sigma_{Ra}} \cdot \frac{\exp\left(-\frac{s}{2\sigma_{Ra}}\right) \cdot \left(\frac{s}{\sigma_{Ra}}\right)^{\frac{M}{2}-1}}{2^{\frac{M}{2}} \cdot \Gamma\left(\frac{M}{2}\right)}$$

In this case, the following apply:

$$\Gamma\left(\frac{M}{2}\right) = \int_0^\infty x^{\frac{M}{2}-1} \cdot e^{-x} dx \qquad (30)$$

$$\sigma_{Ra}^2 = C \cdot \frac{1}{L^2} \cdot R_{rc}^2(\tau) \cdot si^2\left(\Delta\omega \cdot \frac{T_c}{2}\right) + \frac{N_0}{T_c} \qquad (31)$$

In accordance with the invention, both in the case of an underlying Ricean channel model and in the case of a Rayliegh channel model, the quotient $C/N_0$ is first of all estimated and then the quotient $C/N_0$ is used to ascertain the optimum threshold value κ. In the case of a Ricean distribution, the optimum threshold value κ is calculated using the Equations (9), (25), (26) and (28). In the case of a Rayleigh distribution, the calculation of the threshold value κ is based on the Equations (9), (29) and (31).

To determine the optimum threshold value κ, there are basically two different options available. Either the optimum threshold value κ is calculated from the quotient $C/N_0$ while finding the position of the receiver or this calculation is actually performed in advance and the results are entered into a table from which, during execution of the position-finding method, it is now necessary to read only the threshold value κ associated with an estimated value for the quotient $C/N_0$.

It is also possible to include the Rice factor K in the determination of the optimum threshold value κ in the case of a Ricean distribution. To this end, the Rice factor K is estimated in the same way as the quotient $C/N_0$ and is then included in the determination of the optimum threshold value κ. The Rice factor K can likewise be estimated in the estimation unit 10 or 21.

The invention results in a significant increase in the sensitivity of the receiver. The longer the non-coherent integration time $T_n$, the greater the sensitivity in comparison with conventional receivers. By way of example, for a non-coherent integration time $T_n$ of 10 seconds, the gain in sensitivity is 14.3 dB. For a non-coherent integration time $T_n$ of 100 seconds, the gain is 16.8 dB.

Further examples of the increase in sensitivity are shown in FIGS. 3a to 3j. In said figures, the probability $P_d$ of detection of the position-finding signal is respectively plotted against the quotient $C/N_0$ as a function of the non-coherent integration time $T_n$. The dashed curves show the probability $P_d$ of a conventional receiver, while the solid curves indicate the probability $P_d$ which applies for a receiver based on the invention. To calculate the curves depicted in FIGS. 3a to 3j, $P_f=10^{-3}$ and $T_c=20$ ms have been set. The position-finding for the receiver is based on the GPS L1-C/A standard and on an AWGN channel model in the present case.

A method for estimating the quotient $C/N_0$ is explained below.

The ratio of the signal-carrier power C to the noise-power spectral density $N_0=N/T_s$ of the complex envelope of a received position-finding signal in baseband $$y_v = \sqrt{C} \cdot a_v + \sqrt{N} \cdot w_v \qquad (32)$$

can be estimated using the second non-central moment $$M_2 = E\{y_v \cdot y_v^*\} \qquad (33)$$

$$= C \cdot E\{|a_v|^2\} + \sqrt{C \cdot N} \cdot (E\{a_v \cdot w_v^*\} + E\{a_v^* \cdot w_v\}) +$$

$$N \cdot E\{|w_v|^2\}$$

and the fourth non-central moment $$M_4 = E\{(y_v \cdot y_v^*)^2\} \qquad (34)$$

$$= C^2 \cdot E\{|a_v|^4\} + 2C \cdot \sqrt{C \cdot N} \cdot (E\{|a_v|^2 \cdot a_v \cdot w_v^*\} +$$

$$E\{|a_v|^2 \cdot a_v^* \cdot w_v\}) + C \cdot N \cdot (E\{(a_v \cdot w_v^*)^2\} +$$

$$4 \cdot E\{|a_v|^2 \cdot |w_v|^2\} + E\{(a_v^* \cdot w_v)^2\}) + 2N \cdot \sqrt{C \cdot N} \cdot$$

$$(E\{|w_v|^2 \cdot a_v \cdot w_v^*\} + E\{|w_v|^2 \cdot a_v^* \cdot w_v\}) + N^2 \cdot E\{|w_v|^4\}$$

In this case, $a_v$ denotes the normalized complex position-finding signal symbols, $w_v$ denotes the normalized complex noise values, N denotes the noise power and $T_s$ denotes the sampling period.

If it is assumed that the position-finding signal and the noise are independent random processes with an average value of zero and that the inphase and quadrature components of the noise are independent of one another, then Equations (33) and (34) can be simplified as follows:

$$M_2 = C + N \qquad (35)$$

$$M_4 = k_a \cdot C^2 + 4 \cdot C \cdot N + k_w \cdot N^2 \qquad (36)$$

$k_a$ indicates the kurtosis of the position-finding signal, and $k_w$ indicates the kurtosis of the noise:

$$k_a = \frac{E\{|a_v|^4\}}{(E\{|a_v|^2\})^2} \quad (37)$$

$$k_w = \frac{E\{|w_v|^4\}}{(E\{|w_v|^2\})^2} \quad (38)$$

Resolving the above equations for C and N gives:

$$\hat{C} = \frac{M_2 \cdot (k_w - 2) \pm \sqrt{(4 - k_a \cdot k_w) \cdot (M_2)^2 + M_4 \cdot (k_a + k_w - 4)}}{k_a + k_w - 4} \quad (39)$$

$$\hat{N} = M_2 - \hat{S} \quad (40)$$

For the kurtosis $k_a$ of an M-PSK signal and of a GPS or Galileo position-finding signal, the following applies:

$$k_a = 1 \quad (41)$$

In addition, the following applies for the kurtosis $k_w$ of the noise:

$$k_w = 2 \quad (42)$$

Overall, for the ratio of the signal-carrier power C to the noise-power spectral density $N_0$ of the complex envelope of an M-PSK signal, particularly in the GPS or Galileo standard, the following is obtained:

$$\frac{\hat{C}}{\hat{N}_0} = \frac{\sqrt{2 \cdot (E\{|y_v|^2\})^2 - E\{|y_v|^4\}}}{T_S \cdot \left( E\{|y_v|^2\} - \sqrt{2 \cdot (E\{|y_v|^2\})^2 - E\{|y_v|^4\}} \right)} \quad (43)$$

Figure 4:
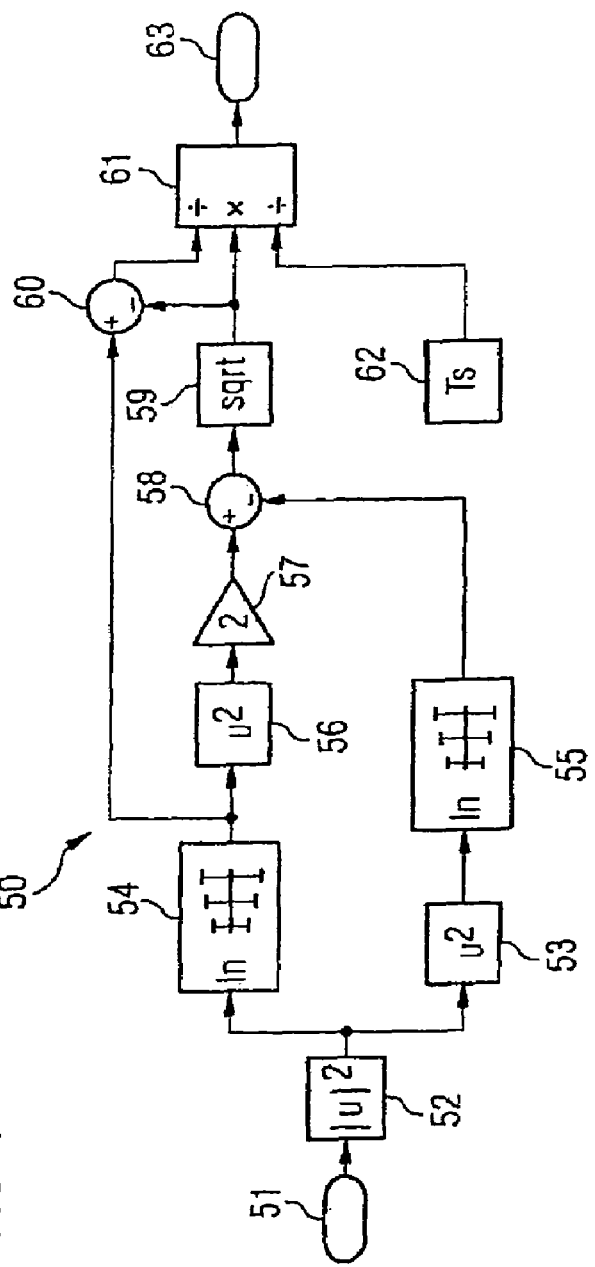
FIG. 4 is a block diagram illustrating an estimation apparatus 50 for estimating the quotient $C/N_0$.

FIG. 4 shows the block diagram of an estimation apparatus 50 which can be used to estimate the quotient $C/N_0$ in accordance with Equation (43).

Signal values are input into the estimation apparatus 50 via an input 51. The input 51 has an absolute-value squaring unit 52 connected downstream of it. The output of the absolute-value squaring unit 52 is connected to the inputs of a squaring unit 53 and of a continuous averaging unit 54. The continuous averaging unit 54 delivers approximation values for the terms $E\{|y_v|^2\}$ appearing in Equation (43). The output of the squaring unit 53 feeds the input of a continuous averaging unit 55. The continuous averaging unit 55 delivers approximation values for the terms $E\{|y_v|^4\}$ appearing in Equation (43).

Downstream of the continuous averaging unit 54, a squaring unit 56 and a two-times multiplier 57 are arranged in series. The output of the two-times multiplier 57 is connected to an input of an adder 58. The other input of the adder 58 is connected to the output of the continuous averaging unit 55 with a negative arithmetic sign. The adder 58 has a downstream square-root formation unit 59 whose output with a negative arithmetic sign is connected to an adder 60. In addition, the adder 60 has the output of the continuous averaging unit 54 connected to it.

The multiplication input of a multiplier/divider 61 is connected to the output of the square-root formation unit 59. The division inputs of the multiplier/divider 61 are supplied with the output of the adder 60 and with the sampling period $T_s$, which is provided by a unit 62. The estimate for the quotient $C/N_0$ is provided at the output 63 of the estimation apparatus 50.

Figure 5:
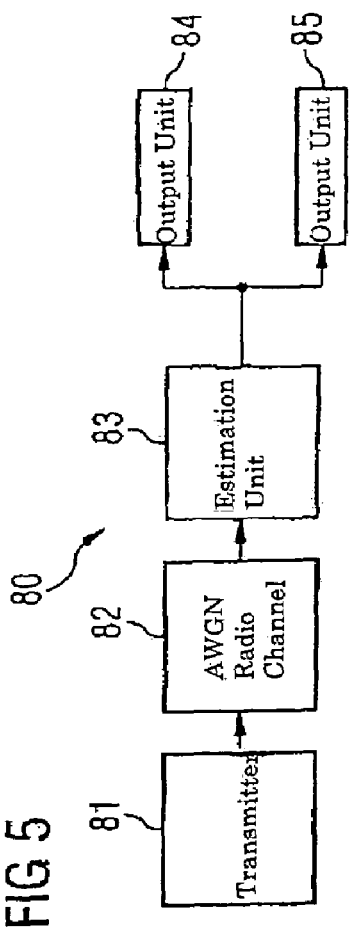
FIG. 5 is a block diagram illustrating a simulation circuit 80 according to one exemplary embodiment of the invention.

FIG. 5 shows the block diagram of a simulation circuit 80 for performing simulation of an AWGN radio channel. The simulation circuit 80 may also be implemented in software.

The simulation circuit 80 comprises a transmitter 81, an AWGN radio channel 82, an estimation apparatus 83 for estimating the quotient $C/N_0$ and output apparatuses 84 and 85 for outputting the estimated $C/N_0$ value and for outputting ascertained $C/N_0$ curves.

Figure 6:
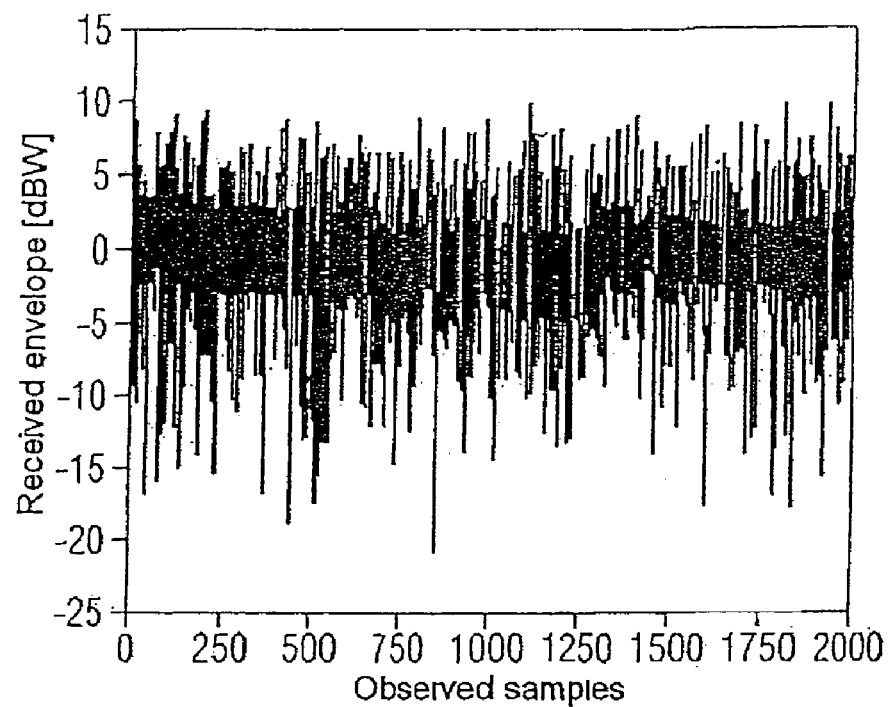
FIG. 6 is a graph illustrating representation of simulation results for an AWGN radio channel which are obtained using the simulation circuit 80 of the present invention.
Figure 7:
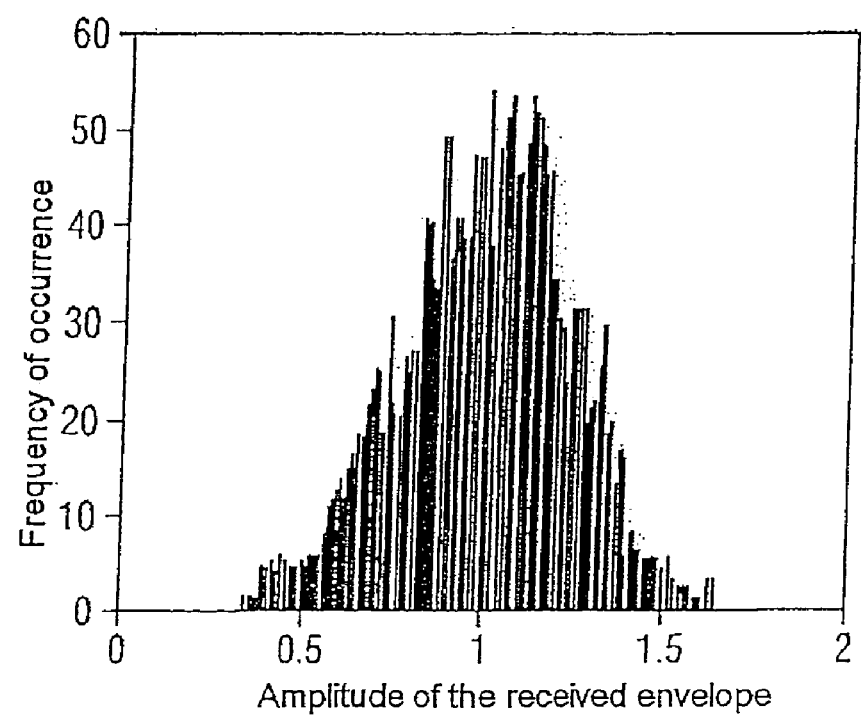
FIG. 7 is a histogram illustrating the amplitudes of the received envelope which are obtained from the simulation.
Figure 8A:
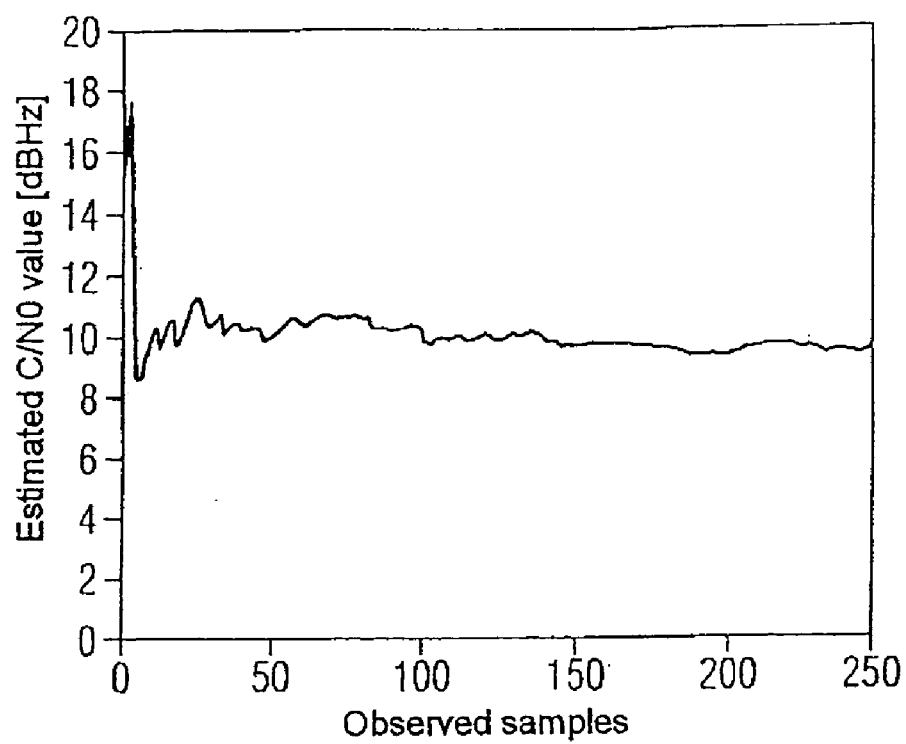
FIGS. 8a and 8b are graphs illustrating the $C/N_0$ values obtained from the simulation.
Figure 8B:
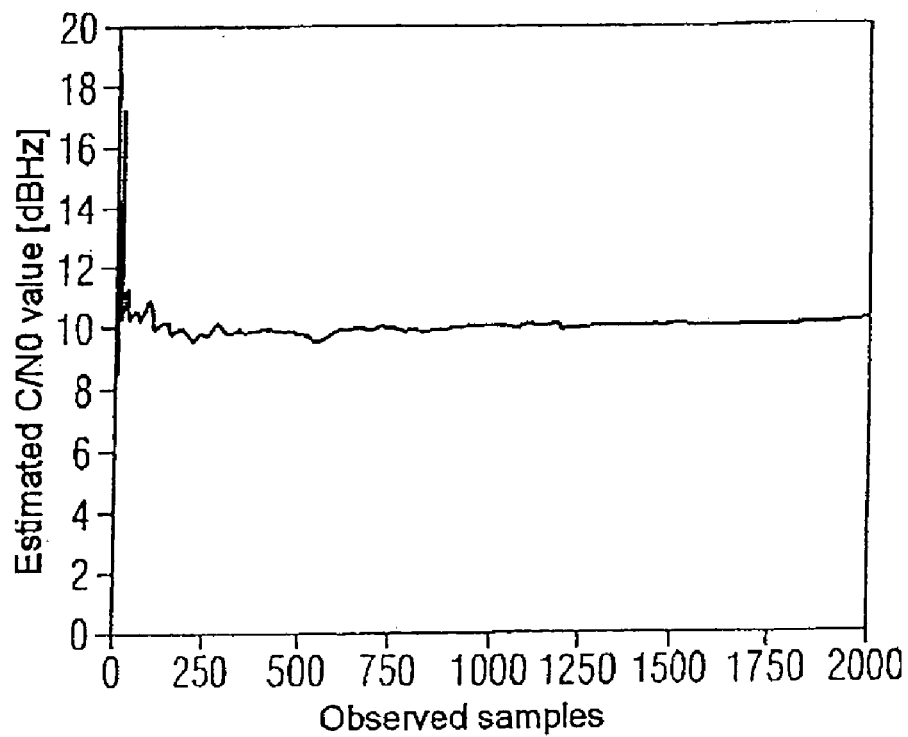

FIG. 6 shows the simulation results for the AWGN radio channel. The simulation of the AWGN radio channel is based on a value of 10 dBHz for the ratio $C/N_0$. FIG. 7 plots the amplitudes of the received envelope in a histogram. The graphs in FIGS. 8a and 8b show the estimated $C/N_0$ values. It can be seen from FIGS. 8a and 8b that the estimated $C/N_0$ values come close to the value 10 dBHz.

The text below explains a method for estimating the Rice factor K. This method is described in the aforementioned U.S. patent application Ser. Nos. 11/146,647 and 11/174,211.

The method for estimating the Rice factor K is based on the second and fourth non-central moments of the Ricean distribution. In very general terms, the non-central moment of the Ricean distribution can be indicated by the following equation:

$$E\{R^n\} = 2^{\frac{n}{2}} \cdot \sigma^n \cdot \Gamma\left(\frac{n}{2} + 1\right) \cdot \exp\left(-\frac{A^2}{2\sigma^2}\right) \cdot {}_1F_1\left(\frac{n}{2} + 1; 1; \frac{A^2}{2\sigma^2}\right) \quad (44)$$

In Equation (44), $_1F_1(x;y;z)$ represents the confluent hypergeometric function. The straight non-central moments of the Ricean distribution are simplified to produce ordinary moments. In particular, the following therefore apply:

$$E\{R^2\} = A^2 + 2\sigma^2 \quad (45)$$

$$E\{R^4\} = A^4 + 8\sigma^2 A^2 + 8\sigma^4 \quad (46)$$

The definition of the Rice factor K has already been indicated above:

$$K = \frac{A^2}{2\sigma^2} \quad (47)$$

Since all individual moments of the Ricean distribution are dependent on $\sigma$ and K, an auxiliary function is defined which is now dependent only on the Rice factor K:

$$f_{n,m}(K) = \frac{(E\{R^n\})^m}{(E\{R^m\})^n} \quad (48)$$

$$f_{2,4}(K) = \frac{(E\{R^2\})^4}{(E\{R^4\})^2} = \left[\frac{(K+1)^2}{K^2 + 4K + 2}\right]^2 \quad (49)$$

Resolving Equation (49) for K delivers a non-negative solution which indicates an estimation of the Rice factor K:

$$\hat{K}_{2,4} = \frac{\hat{E}\{R^4\} - 2 \cdot (\hat{E}\{R^2\})^2 - \hat{E}\{R^2\} \cdot \sqrt{2 \cdot (\hat{E}\{R^2\})^2 - \hat{E}\{R^4\}}}{(\hat{E}\{R^2\})^2 - \hat{E}\{R^4\}} \quad (50)$$

The method described is distinguished by rapid convergence and low implementation complexity.

FIG. 9 shows a block diagram of an estimation apparatus 100 for estimating the Rice factor K in accordance with the above Equation (50).

In line with the block diagram shown in FIG. 9, signal values are input into the estimation apparatus 100 via an input 101. The signal values are first of all supplied to an absolute-value squaring unit 102. The output thereof is connected to the input of a squaring unit 103 and to the input of a continuous averaging unit 104. The continuous averaging unit 104 delivers approximation values for the terms $\hat{E}\{R^2\}$ which appear in the Equation (50). The output of the squaring unit 103 is connected to the input of a continuous averaging unit 105. The continuous averaging unit 105 delivers approximation values for the terms $\hat{E}\{R^4\}$ which appear in the Equation (50).

The output of the continuous averaging unit 104 is connected to the input of a squaring unit 106 and to the first input of a multiplier 107. The output of the squaring unit 106 is connected to the first input of an adder 108, while the output of the continuous averaging unit 105 is connected to the second input of the adder 108 with a negative arithmetic sign. The output of the squaring unit 106 is also connected to a times-two multiplier 109. The latter's output is connected to a first input of an adder 110, whose second input is connected to the output of the continuous averaging unit 105 with a negative arithmetic sign. The output of the adder 110 is connected to a square-root formation unit 111 whose output is connected to the second input of the multiplier 107.

The output of the multiplier 107 is connected to a first input of an adder 112 with a negative arithmetic sign, and a second input of the adder 112 has the output of the times-two multiplier 109 with a negative arithmetic sign connected to it, and a third input of the adder 112 has the output of the continuous averaging unit 105 connected to it. The output of the adder 112 is connected to the multiplier input of a combined multiplier/divider 113, while the division input has the output of the adder 108 connected to it. The multiplier input is supplied with the numerator of the right-hand expression in Equation (50), while the division input is supplied with the denominator. The output of the combined multiplier/divider 113 delivers the estimate of the Rice factor K. The estimate can be tapped off at the output 114 of the estimation apparatus 100.

While the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

The invention claimed is:

1. A receiver in a position-finding system which is configured to ascertain a position based on an evaluation of different propagation times for position-finding signals, the position-finding signals being emitted by a plurality of transmitters at known positions and being received by the receiver, comprising:

a calculation unit configured to calculate a statistical value from a signal received by the receiver; and a detector unit configured to compare the statistical value with a threshold value and use the comparison to determine whether the received signal is a position-finding signal or whether the received signal is used for finding the position of the receiver;

an estimation unit configured to estimate a ratio of the signal-carrier power to the noise-power spectral density of the received signal; and a determination unit configured to determine the threshold value from the estimated ratio of the signal-carrier power to the noise-power spectral density.

2. The receiver of claim 1, wherein the determination unit is configured to calculate a probability density of the received signal from the estimated ratio of the signal-carrier power to the noise-power spectral density and calculate the threshold value from the probability density.

3. The receiver of claim 1, wherein the determination unit is further configured to calculate a probability density of the received signal from the estimated ratio of the signal-carrier power to the noise-power spectral density, and determine the threshold value from the probability density using a table associated therewith.

4. The receiver of claim 1, wherein the determination unit is configured to determine the threshold value from the estimated ratio of the signal-carrier power to the noise-power spectral density using a table associated therewith.

5. The receiver of claim 1, wherein the determination unit is configured to calculate the threshold value from a prescribed fixed misdetection probability, wherein the misdetection probability comprises the probability that the received signal is not a synchronized position-finding signal, but is incorrectly considered to be a position-finding signal by the detector unit.

6. The receiver of claim 1, wherein the calculation unit is configured to sample the received signal and feed the samples to a series circuit which comprises a first integrator for coherent integration, an absolute-value squaring unit or absolute-value formation unit, and a second integrator for non-coherent integration, wherein the series circuit is operable to generate the statistical value based on the samples.

7. The receiver of claim 1, wherein the position-finding signals emitted by the transmitters are spread-coded, and wherein the calculation unit comprises a despreading unit for despreading the received signal.

8. The receiver of claim 7, wherein the estimation unit is fed with the statistical value by the calculation unit or with despread samples of the received signal by the despreading unit.

9. The receiver of claim 1, further comprising a further estimation unit configured to estimate a Rice factor of the radio link which was used to transmit the received signal, and wherein the determination unit is configured to use the estimated Rice factor to determine the threshold value.

10. The receiver of claim 9, wherein the Rice factor is estimated by the estimation unit in accordance with $$\hat{K}_S \approx \frac{\hat{E}\{R^2\} - 2 \cdot \hat{E}\{(R - \hat{E}\{R\})^2\}}{2 \cdot \hat{E}\{(R - \hat{E}\{R\})^2\}}$$

or in accordance with $$\hat{K}_{2,4} = \frac{\hat{E}\{R^4\} - 2 \cdot (\hat{E}\{R^2\})^2 - \hat{E}\{R^2\} \cdot \sqrt{2 \cdot (\hat{E}\{R^2\})^2 - \hat{E}\{R^4\}}}{(\hat{E}\{R^2\})^2 - \hat{E}\{R^4\}}$$

where R is the amplitude of samples of the received signal, and $\hat{E}\{x\}$ is approximated by continuous averaging of x.

11. The receiver of claim 1, wherein the ratio of the signal-carrier power to the noise-power spectral density of the received signal is estimated by the estimation unit in accordance with $$\frac{\hat{C}}{\hat{N}_0} = \frac{\sqrt{2 \cdot (E\{|y_v|^2\})^2 - E\{|y_v|^4\}}}{T_s \cdot \left(E\{|y_v|^2\} - \sqrt{2 \cdot (E\{|y_v|^2\})^2 - E\{|y_v|^4\}}\right)}$$

where $T_s$ is the period for sampling the received signal, $y_v$ is the complex envelope of the received signal in baseband, and the expected value $E\{x\}$ is approximated by continuous averaging of x.

12. The receiver of claim 1, wherein the transmitters in the position-finding system are arranged on satellites or terrestrially.

13. A method for finding a position of a receiver in a position-finding system which is based on the evaluation of different propagation times for position-finding signals, the position-finding signals being emitted by a plurality of transmitters at known positions and being received by the receiver, comprising:
   (a) calculating a statistical value from a signal received by the receiver;
   (b) estimating a ratio of the signal-carrier power to the noise-power spectral density of the received signal;
   (c) determining a threshold value from the estimated ratio of the signal-carrier power to the noise-power spectral density of the received signal;
   (d) comparing the statistical value with the threshold value; and
   (e) using the comparison result to determine whether the received signal is a position-finding signal or whether the received signal is used for finding the position of the receiver.

14. The method of claim 13, wherein act (c) further comprises calculating a probability density of the received signal from the estimated ratio of the signal-carrier power to the noise-power spectral density of the received signal, and wherein in act (d) the threshold value is determined from the probability density.

15. The method of claim 13, wherein act (c) further comprises calculating a probability density of the received signal from the estimated ratio of the signal-carrier power to the noise-power spectral density of the received signal, and wherein in act (d) the threshold value is determined from the probability density using a table.

16. The method of claim 13, wherein act (c) further comprises determining the threshold value from the estimated ratio of the signal-carrier power to the noise-power spectral density of the received signal using a table.

17. The method of claim 13, wherein determining the threshold value comprises calculating the threshold value from a prescribed fixed misdetection probability, wherein the misdetection probability comprises the probability that the received signal is not a synchronized position-finding signal but is incorrectly considered to be a position-finding signal in step (e).

18. The method of claim 13, wherein the received signal is a spread-coded signal, and wherein act (a) further comprises:
   sampling and dispreading the received spread-coded signal;
   integrating coherently the despread samples;
   absolute-value squaring the results of the coherent integration; and
   integrating non-coherently the absolute-value squares to calculate the statistical value.

19. The method of claim 18, wherein estimating the ratio of the signal-carrier power to the noise-power spectral density of the received signal in act (b) comprises estimating the ratio from the statistical value or from despread samples of the received signal, or from coherently integrated despread samples of the received signal, or from the absolute value of coherently integrated despread samples of the received signal.

20. The method of claim 13, further comprising estimating a Rice factor of the radio link which was used to transmit the received signal, and using the estimated Rice factor to determine the threshold value in act (c).

21. The method of claim 20, wherein the Rice factor is estimated in accordance with $$\hat{K}_s \approx \frac{\hat{E}\{R^2\} - 2 \cdot \hat{E}\{(R - \hat{E}\{R\})^2\}}{2 \cdot \hat{E}\{(R - \hat{E}\{R\})^2\}}$$

or in accordance with $$\hat{K}_{2,4} = \frac{\hat{E}\{R^4\} - 2 \cdot (\hat{E}\{R^2\})^2 - \hat{E}\{R^2\} \cdot \sqrt{2 \cdot (\hat{E}\{R^2\})^2 - \hat{E}\{R^4\}}}{(\hat{E}\{R^2\})^2 - \hat{E}\{R^4\}}$$

where R is the amplitude of samples of the received signal, and $\hat{E}\{x\}$ is approximated by continuous averaging of x.

22. The method of claim 13, wherein the ratio of the signal-carrier power to the noise-power spectral density of the received signal is estimated in accordance with $$\frac{\hat{C}}{\hat{N}_0} = \frac{\sqrt{2 \cdot (E\{|y_v|^2\})^2 - E\{|y_v|^4\}}}{T_s \cdot \left(E\{|y_v|^2\} - \sqrt{2 \cdot (E\{|y_v|^2\})^2 - E\{|y_v|^4\}}\right)}$$

where $T_s$ is the period for sampling the received signal, $y_v$ is the complex envelope of the received signal in baseband, and the expected value $E\{x\}$ is approximated by continuous averaging of x.

23. The method of claim 13, wherein the transmitters in the position-finding system are arranged on satellites or terrestrially.

* * * * *